United States Patent
Huang et al.

(10) Patent No.: US 8,177,600 B2
(45) Date of Patent: May 15, 2012

(54) SINGLE ROTOR MODEL HELICOPTER WITH IMPROVED STABILITY BEHAVIOR

(75) Inventors: Guochuan Huang, Zhejiang (CN); Yuchen Wu, Shanghai (CN); Yizhen Yu, Shanghai (CN); Huanzhong Ding, Shanghai (CN)

(73) Assignee: Shanghai Nine Eagles Electronic Technology Co., Ltd., Shanghai (CN)

( * ) Notice: Subject to any disclaimer, the term of this patent is extended or adjusted under 35 U.S.C. 154(b) by 196 days.

(21) Appl. No.: 12/732,004

(22) Filed: Mar. 25, 2010

(65) Prior Publication Data

US 2010/0178836 A1 Jul. 15, 2010

Related U.S. Application Data

(63) Continuation of application No. PCT/CN2008/071129, filed on May 29, 2008.

(30) Foreign Application Priority Data

Nov. 16, 2007 (CN) .......................... 2007 1 0170488

(51) Int. Cl.
*A63H 27/127* (2006.01)

(52) U.S. Cl. .................... 446/37; 244/17.25; 244/17.11; 416/119; 416/134 A

(58) Field of Classification Search ............... 446/37; 416/119, 134 A; 244/17.25, 17.11
See application file for complete search history.

(56) References Cited

U.S. PATENT DOCUMENTS

| | | | | |
|---|---|---|---|---|
| 6,619,585 B1* | 9/2003 | Lidak | ......................... | 244/17.25 |
| 6,929,215 B2* | 8/2005 | Arlton | ......................... | 244/17.11 |
| 7,134,840 B2* | 11/2006 | Vogel | ............................... | 416/3 |
| 2007/0105475 A1* | 5/2007 | Gotou et al. | .................. | 446/37 |

FOREIGN PATENT DOCUMENTS

| | | |
|---|---|---|
| CN | 1533819 | 10/2004 |
| CN | 2889427 | 4/2007 |
| DE | 195 24 793 | 8/1996 |
| DE | 200 07 283 | 5/2001 |
| DE | 20 2007 000 987 | 4/2007 |
| EP | 2 172 396 | 4/2010 |

OTHER PUBLICATIONS

Supplementary European Search Report of European Application No. 08 75 7540.3, dated Oct. 25, 2010.

* cited by examiner

*Primary Examiner* — Gene Kim
*Assistant Examiner* — Michael Dennis
(74) *Attorney, Agent, or Firm* — J.C. Patents

(57) ABSTRACT

A single rotor model helicopter is provided, comprising a spindle, a rotor clamp disposed on the spindle, a pair of rotor blades disposed on the rotor clamp, and a pair of hybrid control rocker arms. The helicopter further includes an operating system and a balancing system. The pair of hybrid control rocker arms are disposed on both sides of the rotor clamp respectively and rotatably connected to a pitch control rocker arm through each axial hole located on a center of each hybrid control rocker arm, so as to control attack angles of the rotor blades. Each hybrid control rocker arm has two control points. A first pair of control points diagonally opposite each other in the pair of hybrid control rocker arms are controlled by a cyclic torque transmitted from the operating system, and a second pair of control points diagonally opposite each other are controlled by the balancing system. Furthermore, the second pair of control points controlled by the balancing system and the first pair of control points controlled by a swash plate can move relative to each other as mutual fulcrums. The single rotor model helicopter of the present application can separately adjust operating sensitivity and stability, thereby finding an optimum combination of dynamic stability and maneuverability of the model helicopter.

10 Claims, 7 Drawing Sheets

SINGLE ROTOR MODEL HELICOPTER WITH IMPROVED STABILITY BEHAVIOR

CROSS-REFERENCE TO RELATED APPLICATIONS

This application is a continuation of International Patent Application No. PCT/CN2008/071129, filed on May 29, 2008, which claims priority to Chinese Patent Application No. 200710170488.2, filed on Nov. 16, 2007, both of which are hereby incorporated by reference in their entirety.

FIELD OF THE TECHNOLOGY

The present invention relates to a remote control single rotor model helicopter.

BACKGROUND

The technical basis of a remote control single rotor model helicopter is consistent with that of a real helicopter, but their structures are distinctly different. Currently, the control modes of a helicopter include Bell mode, Hiller mode, and Bell-Hiller mixed mode.

The Bell mode is mostly used in the real helicopter, and a typical feature of the mode is that a blade angle of rotor blades is directly controlled, no stabilizing blade is used, and a front edge of the rotor blades has a weight load. Most of the modern helicopters do not even have the weight load, instead the rotor blades perform a waving movement. During flying, when the helicopter encounters the interference of the unstable air flow, a changed aerodynamic load is not transmitted to the helicopter's body, so the helicopter can fly stably. The Bell mode helicopter is characterized in that the action control is relatively direct, so it is sensitive to small movements, but sharp maneuver fly cannot be realized. Therefore, this mode cannot realize the specific requirements on the maneuverability of the common trick model helicopter, that is, high sensitivity, difficult actions, and great rudder operations.

The features of the Hiller mode are opposite to those of the Bell mode, a Hiller control mode R/C helicopter has a pair of Hiller bars. The Hiller bars mainly serve as a medium between servos and main rotor blades. During operation, the Hiller bars are pulled by the servos, and then the main rotor blades are pulled through an aerodynamic force of the Hiller bars. The Hiller mode helicopter is suitable for the sharp maneuver fly, and is mostly applied to the R/C helicopter. However, it is difficult for the pure Hiller mode to obtain the enough stability.

Currently, the Bell-Hiller mixed mode is widely used in model helicopters. The operating procedure of an operating system of the "Bell-Hiller" mode is described in the following. According to an instruction of an electronic receiver in a radio remote control device, a servo controls a non-rotating swash plate to be inclined to a specified direction through a connecting rod. A rotating swash plate is driven by a shifting fork to rotate synchronously with a spindle on an inclined surface of the non-rotating swash plate. During the procedure, a transmission torque of the servo is converted to a cyclic torque. In each rotation cycle, the rotating swash plate pulls a pitch control rocker arm of the Hiller bars through connecting rods, so as to cyclically control an attack angle of the "Hiller" bars to increase or decrease, such that the rotated Hiller bars cyclically rise or fall. Further, the synchronously rotating pitch control rocker arm of the rotor blades is pulled by the connecting rods to change the attack angle, and a lift force of the rotating rotor blades is cyclically increased or decreased, such that a rotor disc of the rotor blades is inclined to a direction specified in the instruction, and a longitudinal torque and a transversal torque resulting from the inclined rotor disc of the rotor blade enable the operated model helicopter to move along the specified direction.

The features of the operating system in the "Bell-Hiller" mode are described in the following. The operation torque of the servo is transmitted to the rotor blades through the aerodynamic force of the "Hiller" bars serving as the medium, but the procedure is not entirely a mechanical transmission, such that the mode meets the demands for the difficult trick actions of the single rotor model helicopter with the great rudder operations. The balancing hammer and the Hiller bars in the "Bell-Hiller" mode are an integral combination, and an axial line of the Hiller bars of most model helicopters in the mode is perpendicular to an axial line of the rotor blades. Due to a gyro effect generated when the Hiller bars rotates, an interference from outside encountered by the model helicopter may be overcome, thereby slightly balancing the model helicopter, and enabling the model to overcome the interference from the outside automatically. However, the Hiller bars rotating under a certain speed has a damping function on the automatic balancing function. Due to the limit of the structure, the balancing function of the Hiller bars is weakened. The above features result in poor balance behavior of the single rotor model helicopter in the mode, and the operation techniques are complicated. In order to entirely master the operation techniques, a coach is required for training, much practice for a long term is needed for mastering the techniques, and the high technical threshold causes great limit to the model.

People in the industry intend to modify the "Bell-Hiller" mode helicopter, so as to improve the balance behavior, and lower the complexity and the difficulty of the operation techniques. However, the automatic balancing function of the balancing hammer and the auxiliary operation function of the Hiller bars are two different technical issues, which, however, are integrated as a whole in the Bell-Hiller mode. Therefore, the structure designed according to the mode cannot have a sufficient design freedom between the maneuverability and the balance behavior.

Despite the above limits, in the field of model helicopters, the application of the "Bell-Hiller" mode on the four-channel radio remote control helicopters or a higher level model becomes a habitual mode. For another coaxial dual-rotor blade model helicopter that can be easily mastered, rotation directions of upper and lower rotor blades are opposite, such that when the model helicopter is operated to travel, the aerodynamic performance of the rotor blades is quite different from that of the single rotor model helicopter, and correspondingly, the operating system and the balancing system have the following distinctive features. A balancing hammer controls the upper rotor blade to achieve fine stability behavior of the helicopter, and the operating system controls the lower rotor blade to operate longitudinal and transversal torques of the helicopter.

Therefore, in the past, when learning to operate the single rotor model helicopter, aero model fans can only select the "Bell-Hiller" mode single rotor model helicopter, which is difficult to master. Actually, the features of the "Bell-Hiller" mode single rotor model helicopter which is suitable for the great rudder operations and has sensitive operation become an obstacle. The operation techniques of the mode are complicated, and the balance behavior of the model helicopter is poor, so many people even cannot master the hovering technique, the basic flying operation of the "Bell-Hiller" mode helicopter, not to mention the trick actions with high difficulty and requiring great rudder operations. Therefore, it is necessary to break away from the habitual mode, and develop a single rotor model helicopter which can fly easily and can be operated more easily.

SUMMARY

The present invention is directed to a single rotor model helicopter with improved balance behavior.

An embodiment of the present invention provides a single rotor model helicopter, which includes a spindle, a rotor clamp disposed on the spindle, a pair of rotor blades disposed on the rotor clamp, and a pair of hybrid control rocker arms. The helicopter further includes an operating system and a balancing system. The operating system includes servos adapted to output a transversal operation torque and a longitudinal operation torque, and a swash plate combination adapted to convert the transversal operation torque and the longitudinal operation torque to cyclic torques. Arms of the servos, the swash plate combination, and the hybrid control rocker arms are connected through connecting rods for transmitting the torques. The balancing system includes a balancing rod connected to the spindle, and a pair of balancing hammers disposed on both ends of the balancing rod. The balancing rod and the hybrid control rocker arms are connected through connecting rods for transmitting the torques. The pair of hybrid control rocker arms are respectively disposed on both sides of the rotor clamp, and rotatably connected to a pitch control rocker arm disposed on both sides of the rotor clamp through axial holes respectively. Each hybrid control rocker arm has two control points, in which a first pair of control points diagonally opposite each other in the pair of hybrid control rocker arms are controlled by the cyclic torque transmitted from the swash plate combination, a second pair of control points diagonally opposite each other are controlled by the balancing system, and the second pair of control points controlled by the balancing system and the first pair of control points controlled by the swash plate combination move relative to each other as mutual fulcrums.

A mechanical longitudinal axial line of the model helicopter is within a range from 70° to 20° of an anti-rotor blade rotation direction of a longitudinal axis of the model helicopter, and a mechanical transversal axial line of the helicopter is within a range from 70° to 20° of an anti-rotor blade rotation direction of a transversal axis of the model helicopter. An axial line of the balancing rod is in front of a front edge of the rotor blades, and a horizontal angle between the axial line of the balancing rod and an axial line of the rotor blades is between 25° and 65°.

In the single rotor model helicopter, among three pairs of connection points, that is, the pair of connection points between the axial holes of the hybrid control rocker arms and the pitch control rocker arm, the first pair of control points, and the second pair of control points, at least two pairs of connection points are pairs of universal hinge joint points.

In the single rotor model helicopter, the mechanical longitudinal axial line is perpendicular to the mechanical transversal axial line.

In the single rotor model helicopter, the balancing hammers are in front of the front edge of the rotor blades; by using a reference horizontal angle between an axial line of the balancing hammers and the axial line of the rotor blades of 45° as a reference angle, adjustment is performed on positive and negative directions, thereby finally obtaining an angle when a balance behavior and an optimum combination of the balance behavior and maneuverability are found through experiments.

In the single rotor model helicopter, a reference mechanical longitudinal axial line of the helicopter is located on a position of 45° of the anti-rotor blade rotation direction of the longitudinal axis of the helicopter, and adjustment is performed on positive and negative directions, thereby finally obtaining a correct angle of the mechanical longitudinal axial line through experiments, and correspondingly determining a correct angle of the mechanism transversal axial line of the helicopter.

In the present invention, the operating system for controlling a blade angle through the mechanical hybrid control rocker arms is applied. Compared with the existing "Bell-Hiller" mode remote control model helicopter, the present invention has the following efficacies. The operating system and the balancing system realize a cyclical operation control on the pitch of the rotor blades together through the hybrid control rocker arms. The two systems are relatively independent, and are capable of separately adjusting the operating sensitivity and dynamic stability, so as to find an optimum combination of the dynamic stability and the maneuverability of the model helicopter. The present invention meets demands of different persons, thereby particularly providing a model having high stability and appropriate operating sensitivity for a beginner of the single rotor model helicopter.

BRIEF DESCRIPTION OF THE DRAWINGS

The features and characteristics of present invention will become more fully understood from the detailed description given herein below for illustration only, and thus are not limitative of the present invention, and wherein.

Figure 1:
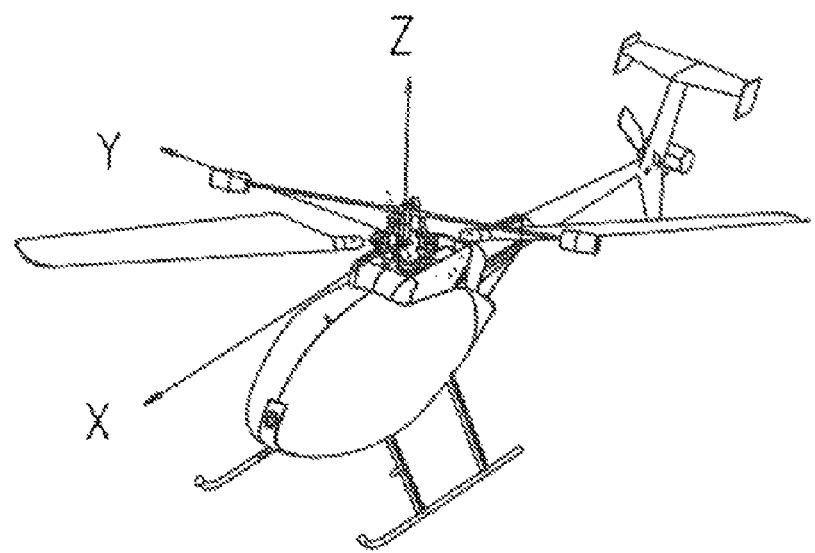
FIG. 1 is a schematic view of xyz coordinate axes of a single rotor model helicopter (Chinese coordinate system, and the same as follows)

In the figures:
1 base
2 first servo
3 second servo
4 servo rocker arm 50 universal hinge joint connection between a first servo rocker arm and a first lower connecting rod
51 universal hinge joint connection between a second servo rocker arm and a second lower connecting rod
52 universal hinge joint connection between a first rocker arm of the non-rotating swash plate and a first lower connecting rod
53 universal hinge joint connection between a second rocker arm of the non-rotating swash plate and a second lower connecting rod
54 universal hinge joint connection between a middle connecting rod and a third rocker arm which is a rocker arm of the rotating swash plate
55 universal hinge joint connection, which is a first universal hinge joint connection between a hybrid control rocker arm and a middle connecting rod
56 universal hinge joint connection, which is a second universal hinge joint connection between a hybrid control rocker arm and a upper connecting rod
57 universal hinge joint connection between a upper connecting rod and a balancing rod
6 first lower connecting rod
7 second lower connecting rod
8 spindle
9 non-rotating swash plate
10 first rocker arm of the non-rotating swash plate
11 second rocker arm of the non-rotating swash plate
12 orientation arm of the non-rotating swash plate
13 sliding chute
14 shifting fork
15 rotating swash plate
16 third rocker arm, which is a rocker arm of the rotating swash plate
17 middle connecting rod
18 hybrid control rocker arm
19 axial line of the hybrid control rocker arm
20 pitch control rocker arm
21 swing axial line of balancing hammers
22 rotor head
23 rotor clamp
24 rotor blade
25 axial line of the rotor blades
26 upper connecting rod
27 balancing rod
28 balancing hammer
29 axial line of the balancing hammers
30 front edge of the rotor blade

DETAILED DESCRIPTION

Embodiments of a single rotor model helicopter according to the present invention are described with reference to the accompanying drawings.

Figure 7:
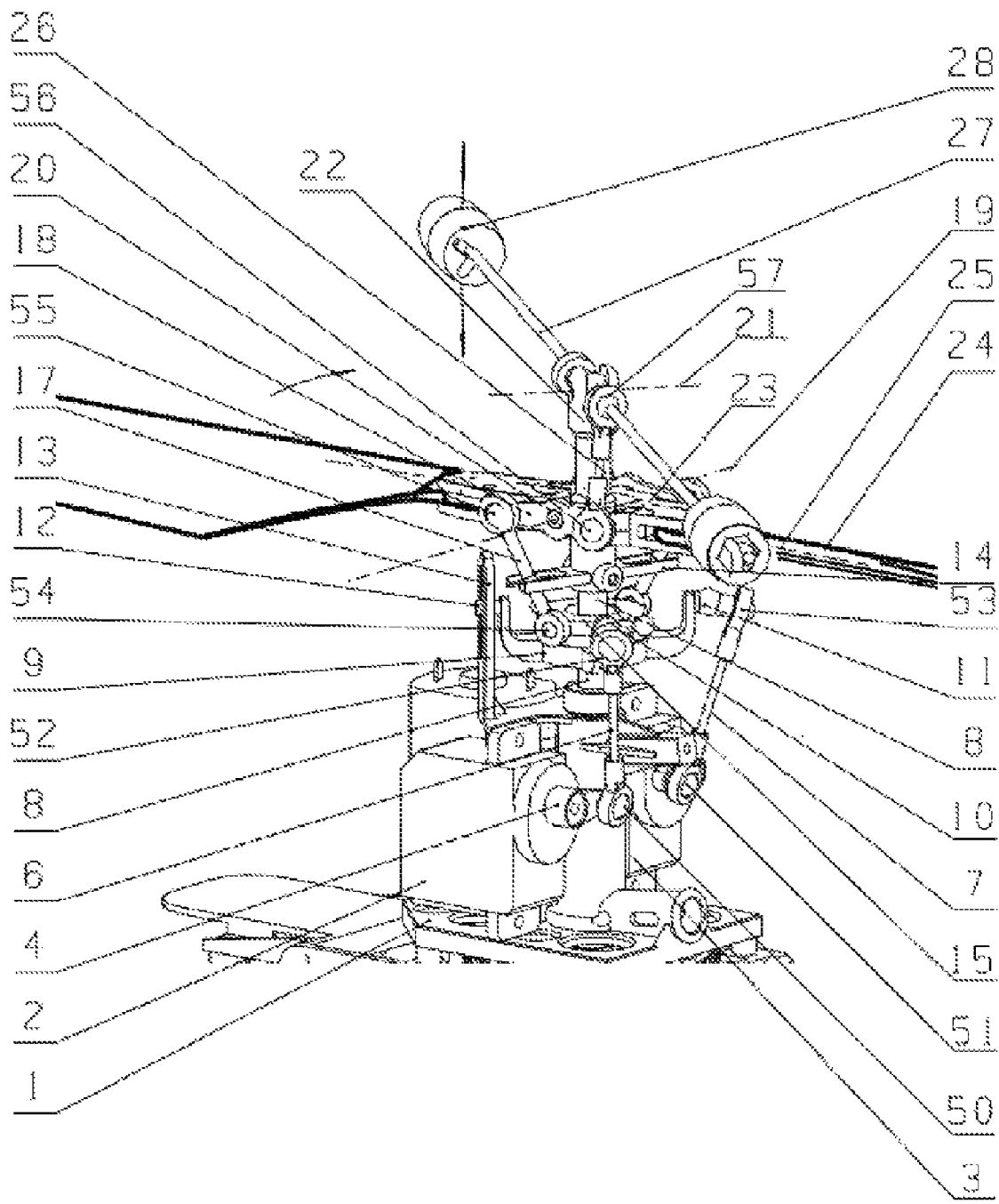
FIG. 7 is a schematic partial structural view of a single rotor model helicopter according to an embodiment of the present invention.

FIG. 7 is a schematic partial structural view of a single rotor model helicopter according to the present invention. Referring to FIG. 7, the helicopter according to the present invention includes a mechanical operating system, a mechanical balancing system, a spindle 8, a rotor clamp 23, and rotor blades 24. The pair of rotor blades 24 are rotated about the spindle 8 as a center, and the rotor blades 24 and the rotor clamp 23 are rotatable within a certain range about an axial line 25 of the rotor blades. An attack angle of the rotor blades 24 relative to an air flow may be increased or decreased, such that the attack angle of the rotor blades may be cyclically changed. Next, structures of the parts are described in detail.

The mechanical operating system mainly includes a base 1, a first servo 2, a second servo 3, a servo rocker arm 4, a first lower connecting rod 6, a second lower connecting rod 7, a swash plate combination composed of a non-rotating swash plate 9 and a rotating swash plate 15, and a pair of middle connecting rods 17. The base 1 is combined with a body (not shown) of the helicopter, and is adapted to bear the first servo 2 and the second servo 3. In addition, the spindle 8 extends vertically upwards from the base 1.

The non-rotating swash plate 9 and the rotating swash plate 15 are connected rotatably through a bearing to form the swash plate combination. The swash plate combination is sleeved on the spindle 8 of the helicopter. The rotating swash plate 15 is inclined as the non-rotating swash plate 9 is operated to be inclined, and a shifting fork 14 drives the middle connecting rods 17, and drives the rotating swash plate 15 to be rotated synchronously with the spindle 8. The swash plate combination converts to-and-fro torques transmitted from the first servo 2 and the second servo 3 through the lower connecting rods 6 and 7 to cyclic torques, and controls a blade angle of the rotor blades to decrease or increase according to an instruction at each rotation cycle of the rotor blades 24, such that a lift force of the rotor blades at a certain angle of a rotor disc is decreased or increased, the rotor disc is inclined and drives the entire model helicopter to be inclined, thereby executing the operation of a longitudinal torque and a transversal torque of the model helicopter, and controlling a traveling direction of the model helicopter.

The mechanical structure of the operating system includes two servos 2 and 3, respectively adapted to receive the instruction and execute the operation of the longitudinal torque and the transversal torque. A rocker arm end on an operation torque output shaft of the first servo 2 forms a universal hinge joint connection 50 with a lower end of the first lower connecting rod 6, and an upper end of the first lower connecting rod 6 forms a universal hinge joint connection 52 with a first rocker arm 10 of the non-rotating swash plate 9. A rocker arm end on an operation torque output shaft of the second servo 3 forms a universal hinge joint connection 51 with a lower end of the second lower connecting rod 7, and an upper end of the second lower connecting rod 7 forms a universal hinge joint connection 53 with a second rocker arm 11 of the non-rotating swash plate 9.

An angle between the first rocker arm 10 and the second rocker arm 11 of the non-rotating swash plate is 90°. In addition, the non-rotating swash plate 9 has an orientation arm 12, the orientation arm 12 is moveable up and down in a sliding chute 13, and the orientation arm 12 only limits the non-rotating swash plate 9 from rotating, but permits the non-rotating swash plate 9 to be inclined to any direction.

Figure 2:
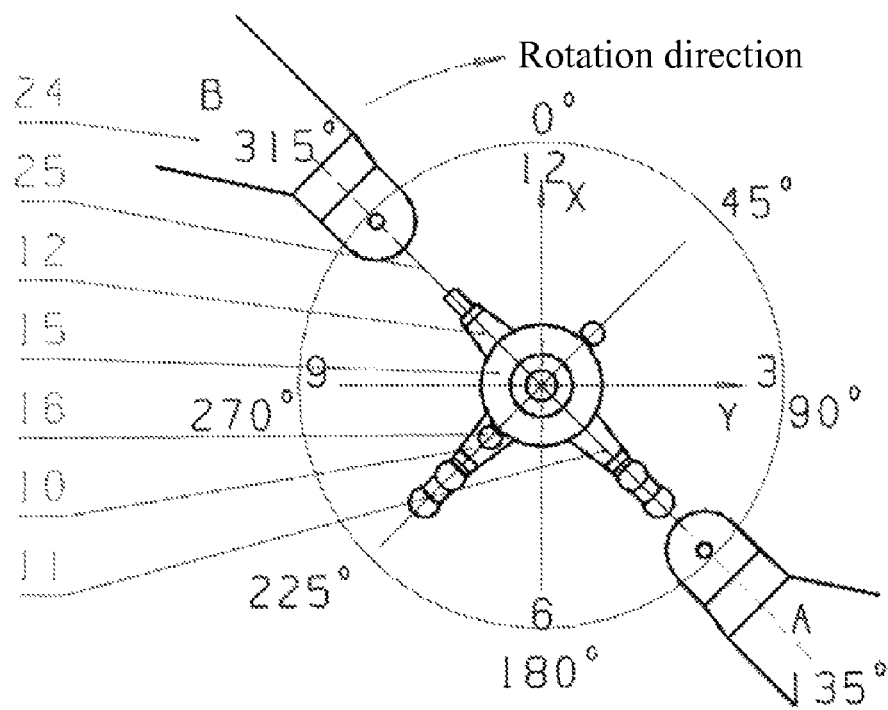
FIG. 2 is a schematic view of rotor blades and a swash plate of the single rotor model helicopter on an X-Y plane.
Figure 8:
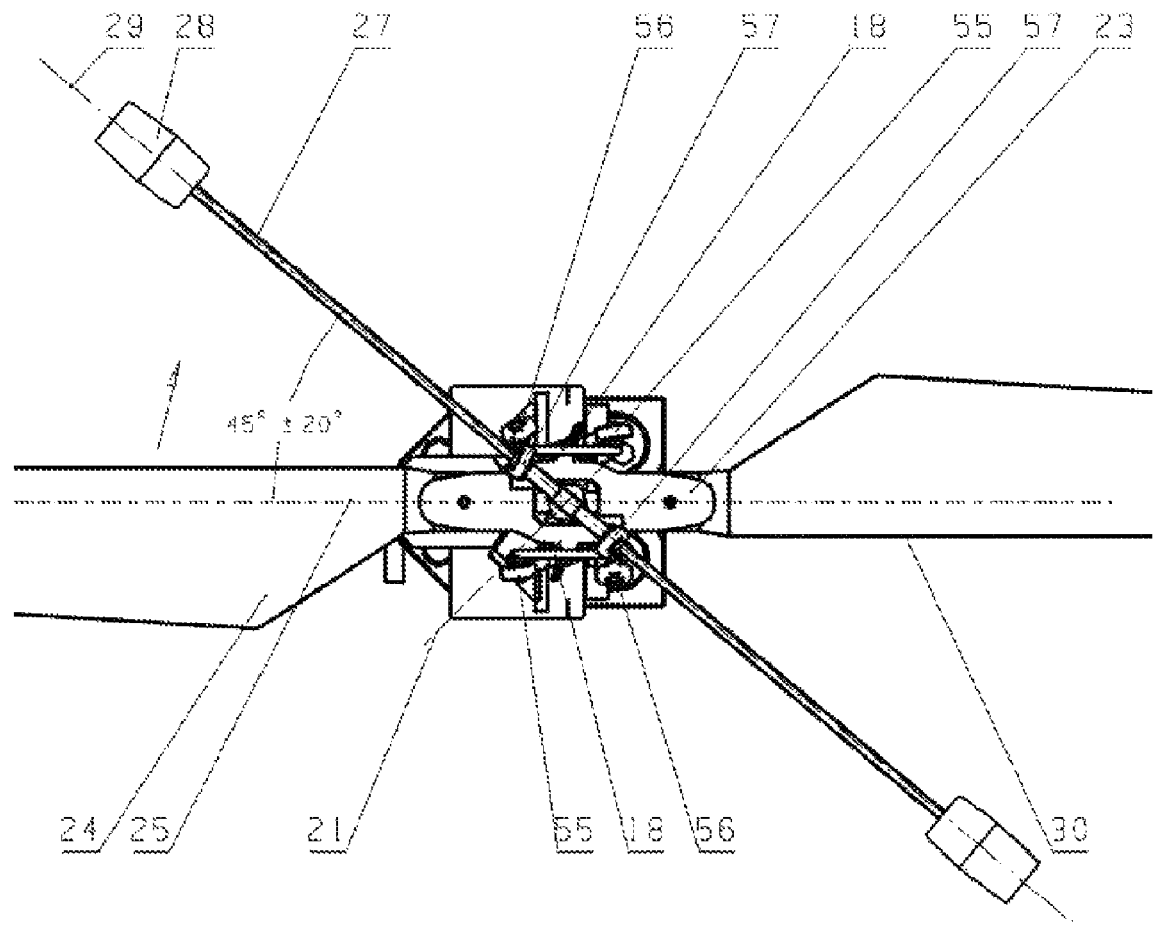
FIG. 8 is a top view of the model helicopter shown in FIG. 7.

A pair of third rocker arms 16 (as shown in FIGS. 2, 7, and 8) on the rotating swash plate 15 are arranged symmetrically by using the spindle as a center, and the two rocker arms form a universal hinge joint connection 54 with lower ends of the middle connecting rods 17. The two middle connecting rods 17 are shifted by the shifting fork 14 rotated synchronously with the spindle, and drive the rotating swash plate 15 to rotate synchronously, so as to convert the operation torques transmitted from the first and the second rocker arms 10 and 11 of the non-rotating swash plate to the cyclic torques, and transmit the cyclic torques to hybrid control rocker arms 18 through the middle connecting rods 17. Upper ends of the two middle connecting rods 17 are connected to a diagonally distributed first universal hinge joint 55 (as shown in FIG. 8) of the two hybrid control rocker arms 18. As such, the control torques of the operating system are transmitted to the pair of hybrid control rocker arms 18.

The pair of hybrid control rocker arms 18 are respectively disposed on both sides of the rotor clamp 23 of the helicopter, and are rotatably connected to a pitch control rocker arm 20 disposed on both sides of the rotor clamp through each axial hole located on the center of each hybrid control rocker arm respectively. The rotor clamp 23 is connected to the rotor blades 24, and cyclically controls the attack angle (as shown in FIG. 8) of the rotor blades by using the axial line 25 of the rotor blades as a rotation axis.

In another aspect, a second universal hinge joint point 56 (as shown in FIG. 7) of the two hybrid control rocker arms 18 is connected to two universal hinge joint points 57 disposed on positions of a balancing rod 27 adjacent to the spindle through a pair of upper connecting rods 26, such that the second universal hinge joint point 56 of the pair of the hybrid control rocker arms is controlled by the balancing system composed of the balancing rod 27 and the balancing hammers 28. The pair of balancing hammers 28 are disposed on both ends of the balancing rod 27, and the balancing rod 27 and the balancing hammers 28 are integrally formed. In this embodiment, a center of the balancing rod 27 is connected to a top end of the spindle 8, that is, located above the rotor blades 24 (as shown in FIG. 7). The balancing rod uses a swing axial line 21 of the balancing hammers as an axis, and the balancing hammers 28 can vertically swing in a direction as shown by the arrow in FIG. 7.

The key design of the present invention is described as follows. The first universal hinge joint point 55 and the second universal hinge joint point 56 of the hybrid control rocker arms 18 are controlled respectively by the operating system and the balancing system. The first universal hinge joint point 55 and the second universal hinge joint point 56 of the hybrid control rocker arms move relative to each other as mutual fulcrums. Particularly, for the operating system, the torque exerted by the operating system on the first universal hinge joint point 55 of the hybrid control rocker arms 18 takes the second universal hinge joint point 56 controlled by the balancing system as a fulcrum; the torque exerted by the balancing system on the second universal hinge joint point 56 of the hybrid control rocker arm 18 takes the first universal hinge joint point 55 controlled by the operating system as a fulcrum. For the operation, the hybrid control rocker arms 18 controlled by the cyclic torques transmitted from the third rocker arms 16 (the rocker arms of the rotating swash plate) through the middle connecting rods 17 finally cyclically control the attack angle of the rotor blades 24 with the axial line 25 of the rotor blades as the rotation axis through the pitch control rocker arm 20 and the rotor clamp 23 in sequence. For the balance, the balancing rod 27 and the balancing hammers 28 having the balancing function drive the second universal hinge joint point 56 of the hybrid control rocker arms 18, and drive the rotor clamp 23 and the rotor blades 24 to rotate with the axial line 25 of the rotor blades as the rotation axis through axial hole connection between the hybrid control rocker arms 18 and the rotor clamp 23.

In addition, it should be noted that, as shown in FIG. 8, it is different from the current Bell-Hiller mode in that a horizontal angle between an axial line 29 of the balancing rod 27 and the balancing hammers 28 and the axial line 25 of the rotor blades 24 is smaller than 90°. In the embodiment of the present invention, a range of the angle is from 25° to 65°, a reference angle is 45°, and the balancing hammers are in front of a front edge 30 of the rotor blades.

In three pairs of connection points of the pair of hybrid control rocker arms 18, positions of the axial holes and positions of the two pairs of control points are changeable, and are not limited to the manners described above. For example, for the two pairs of operation torque control points, one pair is located on the center, and the other pair is located on an end portion of the hybrid control rocker arms, and the connection points of the pitch control rocker arm 20 of the rotor blades are located on the other end portion of the hybrid control rocker arms. To sum up, in the three pairs of connection points, as long as at least two pairs are the universal hinge joint points, the hybrid control rocker arms 18 can be controlled.

Next, key parameter designs of the operating system according to the embodiment of the present invention are described.

Referring to FIGS. 7, 1, and 2, the operating system of the remote control model helicopter of the above embodiment is placed in an XY (Chinese coordination system) reference plane with a center of mass (located on an axial center of the spindle) of the helicopter as an origin point, in which an X axis is the longitudinal axis of the helicopter, and a Y axis is the transversal axis of the helicopter. Several possible situations are given in the following.

Figure 3:
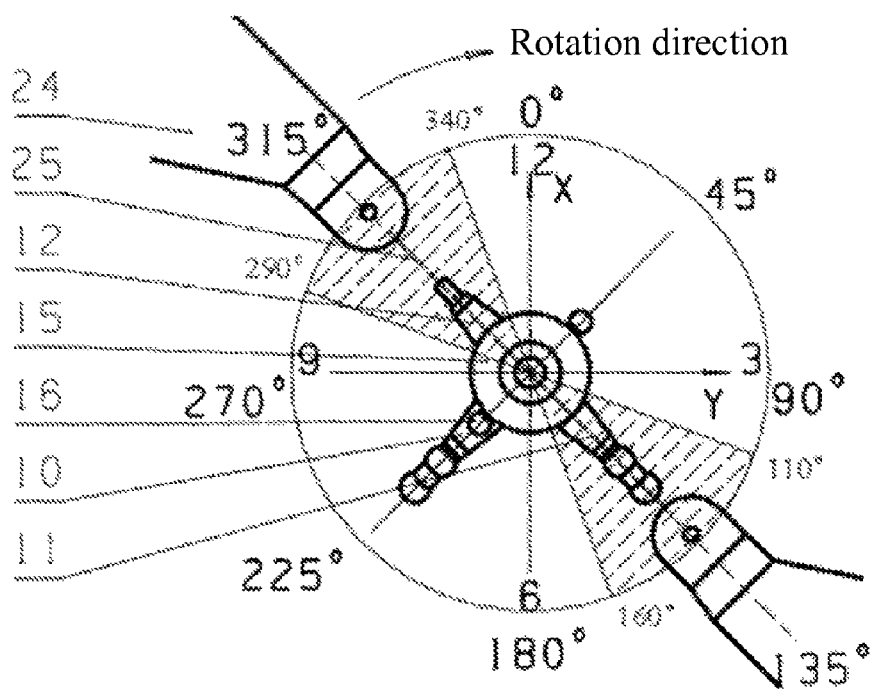
FIG. 3 shows a range of a mechanical longitudinal axial line when the rotor blades are rotated in the clockwise direction.

In a situation that the rotor blades are rotated in a clockwise direction, and an operation rod controls the model helicopter to longitudinally travel, when the third rocker arms 16 (the rocker arms of the rotating swash plate) are rotated to the same position of the first rocker arm 10 of the non-rotating swash plate operating the longitudinal torque (the two axial lines coincide with each other, as shown in FIG. 3), if the longitudinal operation rod is pushed, the blade angle is a minimum time point when the rotor blades 24 are at a position of 315°, and the blade angle of the rotor blades is a maximum time point when the rotor blade 24 is at a position of 135°. When the rotor blades are within a range of rotating from 135° to 180° to 225° to 270° to 315° sequentially, it is a half cycle in which the blade angle is gradually decreased, and similarly, when the rotor blades are within a range of rotating from 315° to 0° to 45° to 90° to 135° sequentially, it is a half cycle in which the blade angle is gradually increased, and if the longitudinal operation rod is pulled, the change cycle of the blade angle of the rotor blades is opposite. In the embodiment, in each rotation cycle of the rotor blades, when the rocker arms 16 of the rotating swash plate are rotated to the same angle coinciding with the first rocker arm 10 of the non-rotating swash plate, if the longitudinal operation rod is pushed, the blade angle is the minimum time point when the rotor blades are at the position of 315°, and is the maximum time point when the rotor blades are at the position of 135°; if the longitudinal operation rod is pulled, the blade angle is the minimum time point when the rotor blades are at the position of 135°, and is the maximum time point when the rotor blades are at the position of 315°. The 315°-135° line is defined as a mechanical longitudinal axial line of the single rotor model helicopter rotated in the clockwise direction.

Figure 4:
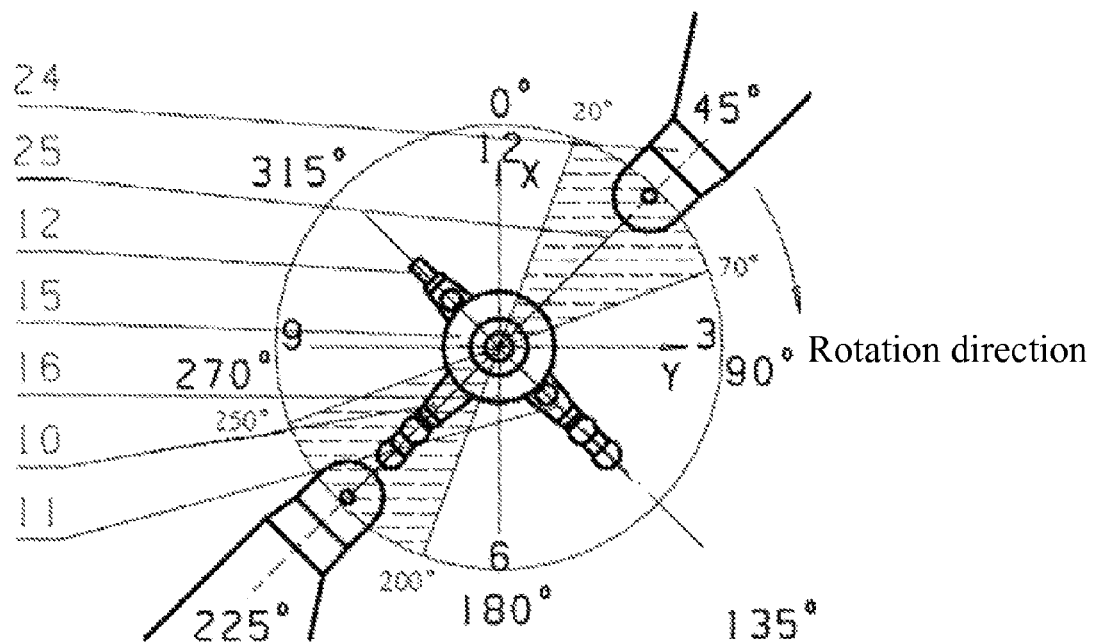
FIG. 4 shows a range of a mechanical transversal axial line when the rotor blades are rotated in the clockwise direction.

In a situation that the rotor blades are rotated in the clockwise direction, and the model helicopter is controlled to transversally travel, when the third rocker arms 16 (the rocker arms of the rotating swash plate) are rotated to the same angle coinciding with the second rocker arm 11 of the non-rotating swash plate (referring to FIG. 4), if the transversal operation rod is operated to travel to left, the blade angle is the minimum time point when the rotor blades are at a position of 225°, and is the maximum time point when the rotor blades are at a position of 45°; if the transversal operation rod is operated to travel to right, the blade angle is the minimum time point when the rotor blades are at the position of 45°, and is the maximum time point when the rotor blades are at the position of 225°. The 225°-45° line is defined as a mechanical transversal axial line of the single rotor model helicopter rotated in the clockwise direction.

Figure 5:
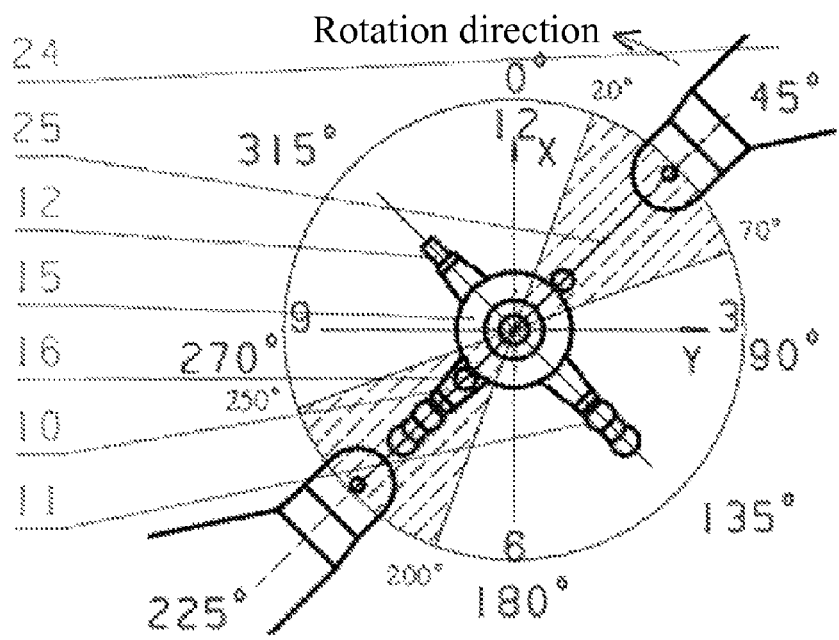
FIG. 5 shows a range of a mechanical longitudinal axial line when the rotor blades are rotated in the counter-clockwise direction.

In a situation that the rotor blades are rotated in the counter-clockwise direction, and the operation rod controls the model helicopter to longitudinally travel, when the third rocker arms 16 (the rocker arms of the rotating swash plate) are rotated to the same position of the first rocker arm 10 of the non-rotating swash plate operating the longitudinal torque (the two axial lines coincide with each other, as shown in FIG. 5), if the longitudinal operation rod is pushed, the blade angle is the minimum time point when the rotor blade is at a position of 45°, and is the maximum time point when the rotor blade is at a position of 225°. In the present embodiment, in each rotation cycle of the rotor blades, if the longitudinal operation rod is pulled, the blade angle is the minimum time point when the rotor blades are at the position of 225°, and is the maximum time point when the rotor blades are at the position of 45°. The 225°-45° line is defined as a mechanical longitudinal axial line of the single rotor model helicopter rotated in the counter-clockwise direction.

Figure 6:
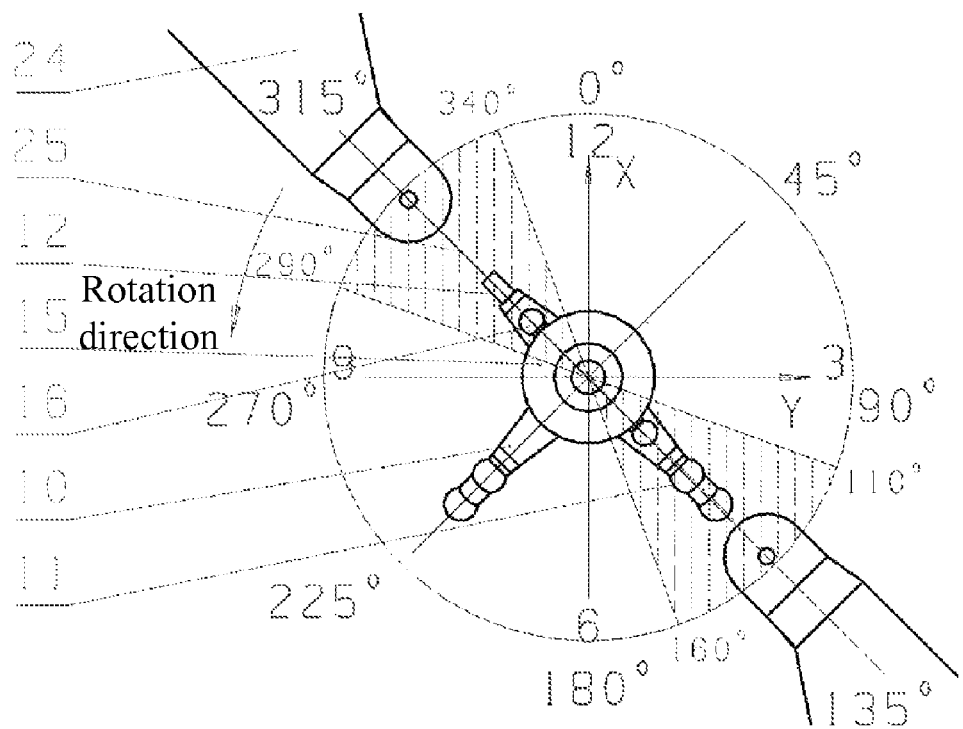
FIG. 6 shows a range of a mechanical transversal axial line when the rotor blades are rotated in the counter-clockwise direction.

In a situation that the rotor blades are rotated in the counter-clockwise direction, and the model helicopter is controlled to transversally travel, when the third rocker arms 16 (the rocker arms of the rotating swash plate) are rotated to the same angle coinciding with the second rocker arm 11 of the non-rotating swash plate (referring to FIG. 6), if the transversal operation rod is operated to travel to left, the blade angle is the minimum time point when the rotor blades are at a position of 315°, and is the maximum time point when the rotor blades are at a position of 135°; if the transversal operation rod is operated to travel to right, the blade angle is the minimum time point when the rotor blades are at the position of 135°, and is the maximum time point when the rotor blades are at the position of 315°. The 315°-135° line is defined as a mechanical transversal axial line of the single rotor model helicopter rotated in the counter-clockwise direction.

To sum up, the method for determining a position of the mechanical longitudinal axial line of the single rotor model helicopter in the XY coordinates is as following: when the third rocker arms 16 (the rocker arms of the rotating swash plate) are rotated to the same angle with the first rocker arm 10 (longitudinal operation rocker arm) of the non-rotating swash plate, the axial line of the rotor blades is the mechanism longitudinal axial line; when the third rocker arms 16 (the rocker arms of the rotating swash plate) are rotated to the same angle with the second rocker arm 11 (transversal operation rocker arm) of the non-rotating swash plate, the axial line of the rotor blades is the mechanism transversal axial line.

The angle between the mechanical longitudinal axial line and the X axis is very important in the present invention. In a preferred design, when a longitudinal push rod (pushing-elevator) of the model helicopter is operated, the traveling direction of the model helicopter is consistent with a pointed direction of the X axis of the helicopter, and the model helicopter travels correctly in the longitudinal direction. For example, experiment data (1) is given below. In a four-channel single rotor model helicopter mainly for indoor flying, main data of the rotor blade is described in the following. A diameter is 380 mm, an average blade chord of the rotor blades in a main working segment is 24.8 mm, a weight of a single rotor blade is 5-6 grams (g), a rotation speed of the rotor blades when the helicopter is hovering in the air or horizontally travels is 1600-1800 rounds/min, a speed of a blade tip of the rotor blade is 35 meters/second (m/s), usually a traveling speed of the model helicopter is smaller than 2 m/s, the rotor blades are rotated in the clockwise direction, and preferably the angle between the mechanical longitudinal axial line and the X axis is 40°, that is, the mechanical longitudinal axial line is on a 320°-140° line. It is proved by the experiment that when the angle between the mechanical longitudinal axial line and the X axis is larger than 40°, for example, the angle reaches 45° or even larger, the pushing-elevator operates the model helicopter to travel to a left front direction. On the contrary, when the angle between the mechanical longitudinal axial line and the X axis is smaller than 35°, the pushing-elevator operates the model helicopter to distinctly travel to a right front direction. Under the adverse situation, in order to control the model helicopter to travel forwards to the specified direction, it is necessary to maintain a certain angle between the X axis of the model helicopter and the traveling course line. Although the model helicopter may be operated to still travel forwards along the specified course line, a dead-head resistance of the model helicopter is increased during traveling, so the design is apparently unreasonable.

Another experiment data (2) is given below. For the single rotor model helicopter, main data of the rotor blades is described in the following. A diameter of the rotor blades is 520 mm, an average blade chord of the rotor blades in a main working segment is 32 mm, a weight of a single rotor blade is 12-13 g, a rotation speed of the rotor blades when the helicopter is hovering in the air is 1100 rounds/min, an air speed of a blade tip of the rotor blade is 29 m/s, a traveling speed is smaller than 2 m/s, the rotor blades are rotated in the clockwise direction, and preferably the angle between the mechanical longitudinal axial line and the X axis is 50°, that is, the mechanical longitudinal axial line is on a 310°-130° line.

From an aerodynamics perspective, the reason for the existence of the angle between the mechanical longitudinal axial line and the X axis is as follows. When the servos receive the operation instruction, the rocker arms of the servos start to act, through a series of mechanical transmission procedures, the blade angle of the rotor blades is controlled cyclically, such that the rotor blades generate a cyclic lift force difference, the rotor disc is longitudinally inclined, and a longitudinal component force of the lift force of the blades makes the model helicopter longitudinally travel. The procedure is quite time-consuming, so when the model helicopter is operated to longitudinally or transversally travel, the mechanical transmission action requires a preact. The features reflected on the mechanical structure are as follows. An angle exists between the mechanical longitudinal axial line and the X axis of the body axis of the model helicopter, the same angle exists between the mechanical transversal axial line and the Y axis similarly, and the mechanical longitudinal axial line is perpendicular to the mechanical transversal axial line. No matter whether the rotor blade is rotated in the clockwise direction or in the counter-clockwise direction, the mechanical longitudinal axial line is always at a position where there is an angle smaller than 90° between the mechanical longitudinal axial line and the X axis at an anti-rotor blade rotation direction of the X axis of the model helicopter, and the mechanical transversal axial line is always at a position where there is an angle smaller than 90° between the mechanical transversal axial line and the Y axis at an anti-rotor blade rotation direction of the Y axis of the model helicopter.

However, for the different single rotor model helicopters, because of the difference of the basic parameters, for example, a size of the model helicopter, aerodynamic characteristics of the blade type of the rotor blades, a blade load of the rotor blades (g/unit area), a rotation speed of the rotor blades, and a designed traveling speed of the model helicopter, the angles between the mechanical longitudinal axial line and the X axis are different. For example, for a model helicopter having a total weight of less than twenty grams, a diameter of the rotor blades of 150-200 mm, a blade chord in a main working segment of 18-20 mm, a weight of a single rotor blade of 1-2 g, an angle between the mechanical longitudinal axial line and the X axis is much smaller than 45° and near 20°. On the contrary, for a single rotor model helicopter having a total weight of several kilograms and a diameter of the rotor blades of more than 2000 mm, an angle between the mechanical longitudinal axial line and the X axis is much greater than 45° and may be increased to approximately 70°.

In the present invention, a range of the angle between the mechanical longitudinal axial line and the X axis is from 70° to 20°. In the above situation that the rotor blades are rotated in the clockwise direction, the range of the mechanical longitudinal axial line is from the 290°-110° line to the 340°-160° line (the shadow part) in FIG. 3. Correspondingly, a range of the angle between the mechanical transversal axial line and the Y axis is also from 70° to 20°, and is, for example, from the 20°-200° line to the 70°-250° line (the shadow part) in FIG. 4. In the situation that the rotor blades are rotated in the counter-clockwise direction, the range of the mechanical longitudinal axial line is from the 70°-250° line to the 20°-200° line (the shadow part) in FIG. 5. Correspondingly, the mechanical transversal axial line is in a range from the 160°-340° line to the 110°-290° line (the shadow part) in FIG. 6.

To sum up, the mechanical longitudinal axial line of the single rotor model helicopter is at the position where there is the angle smaller than 90° between the mechanical longitudinal axial line and the X axis at the anti-rotor blade rotation direction of the X axis of the model helicopter, preferably the range of the angle between the mechanical longitudinal axial line and the X axis of the model helicopter is from 70° to 20°. The mechanical transversal axial line is always at the position where there is the angle smaller than 90° between the mechanical transversal axial line and the Y axis at the anti-rotor blade rotation direction of the Y axis of the model helicopter, preferably the range of the angle between the mechanical transversal axial line and the Y axis of the model helicopter is from 70° to 20°.

In actual design, the accurate positions of the mechanical longitudinal axial line and the mechanical transversal axial line may be determined through experiments. The method is described in the following. The mechanical longitudinal axial line is adjusted towards the clockwise direction or the counter-clockwise direction by using an angle of 45° (the 315°-135° line, the rotor blades are rotated in the clockwise direction) as a reference, and optimum positions of the mechanical longitudinal axial line and the mechanical transversal axial line perpendicular to the mechanical longitudinal axial line are obtained through several experiments. Particularly, the model helicopter is operated to travel forwards in a straight line, if the X axis of the body forms an angle with the course direction, the position of the sliding chute 13 needs to be changed, such that the orientation arm 12 of the non-rotating swash plate is rotated by a certain angle until the X axis of the body is consistent with the course direction. At this time, the position of the mechanical longitudinal axial line is correct. In the present invention, the above two groups of experiment data may be used as a reference for adjusting the angle. The mechanical longitudinal axial line is always perpendicular to the mechanical transversal axial line, such that once the actual angle between the mechanical longitudinal axial line and the X axis is determined, the angle between the mechanical transversal axial line and the Y axis is also determined. In terms of the mechanical structure, the perpendicular relation between the mechanical longitudinal axial line and the mechanical transversal axial line are determined by the perpendicular relation between the first rocker arm 10 and the second rocker arm 11 of the non-rotating swash plate.

If the positions of the mechanical longitudinal axial line and the mechanical transversal axial line in the operating system are designed inappropriately, when a bias is not great, for example, ±10°-20°, although the model helicopter may be operated to fly, when the model helicopter flies in a straight course line, the pointed direction of the X axis of the model helicopter is operated to form an angle of ±10°-20° with the course line, such that the deadhead resistance of the helicopter is increased, which causes troubles to the operator. Therefore, in the present invention, in addition to the ranges of the positions of the mechanical longitudinal axial line and the mechanical transversal axial line, a method for obtaining the accurate positions through experiments is provided. Persons skilled in the art may easily find the correct positions of the mechanical longitudinal axial line and the mechanical transversal axial line of the single rotor model helicopter according to the techniques and the method provided by the present invention.

After the actual angle between the mechanical longitudinal axial line and the X axis is determined, in the structural design of the operating system, the space positions of the orientation arm 12 of the non-rotating swash plate, the sliding chute 13, the first rocker arm 10 of the non-rotating swash plate, the first servo 2, and the second servo 3 in the model helicopter may be determined easily. In the operating system as shown in FIG. 7, the middle connecting rods 17 have an inclined angle for realizing the space position of each part. The angle of the position of the shifting fork 14 in the XY plane coordinates is determined by the middle connecting rods 17. Persons skilled in the art may turn the middle connecting rods 17, the first lower connecting rod 6, and the second lower connecting rod 7 to an appropriate angle, so as to adjust the space positions of the first rocker arm 10 of the non-rotating swash plate, the first servo 2, and the second servo 3 in the model helicopter, and definitely, the over-inclination of the middle connecting rods 17, the first lower connecting rod 6, and the second lower connecting rod 7 may reduce the transmission efficiency of the servos. If the space of the model helicopter allows, the middle connecting rods 17, the first lower connecting rod 6, and the second lower connecting rod 7 are adjusted to positions parallel with or nearly parallel with an Z axis, so as to adjust the first rocker arm 10 and the second rocker arm 11 of the non-rotating swash plate, the first servo 2, and the second servo 3 to the appropriate positions. Alternatively, the middle connecting rods 17 in the operating system as shown in FIG. 7 (the rotor blades are rotated in the clockwise direction) are changed to positions parallel with the Z axis (a standing state) or near a standing state, but the following parts need to be rotated in the clockwise direction by an angle, for example, 30°-40°. The parts are the orientation arm 12 of the non-rotating swash plate, the sliding chute 13, the first lower connecting rod 6, the second lower connecting rod 7, the first rocker arm 10, the first servo 2, and the second servo 3. During the actual implementation, limited by the space positions, it is difficult for the middle connecting rods and the lower connecting rod to be totally parallel with the Z axis, and usually only the over-inclination is prevented.

The basic principle of the balancing system according to the present invention is described in the following.

The spindle 8 of the model helicopter drives the rotor clamp 23, the rotor blades 24, and the balancing hammers 28 to be rotated in the clockwise (or the counter-clockwise) direction, and the rotated balancing hammers 28 are like rotated rotate gyros, so a gyro effect of the balancing hammers makes the balancing rod and the balancing hammers always maintain at an axially stable rotation state.

If the model helicopter is interfered by the outside during flying, for example, the right rotor blade is interfered by the outside and rises, and the left rotor blade falls (from a viewing angle of the reader in FIG. 7), such that the spindle 8 of the model helicopter is inclined with the center of mass of the helicopter as a center. Further, due to the gyro effect, a pointed direction of the rotation axis of the balancing hammers 28 in the rotation state is still in the original direction, that is, the balancing rod and the balancing hammers are still rotated on the original rotation plane, such that the perpendicular relation between the spindle 8 of the model helicopter and the balancing rod and the balancing hammers is changed to a non-perpendicular relation, and the angle between them is changed from 90° to be smaller than 90°. Here, the upper end of the upper connecting rod 26 is driven by the balancing rod 27 and the balancing hammers 28 at the hinge joint point 57 to push the hinge joint point 56 of the hybrid control rocker arms 18 downwards, such that the hybrid control rocker arms 18 are turned downwards for a certain angle with the hinge joint point 55 as a fulcrum (center of circle). Further, the rotor clamp 23 and the rotor blades 24 are driven to be rotated by using the axial line 25 of the rotor blade as the rotation axis through the axial hole connection between the hybrid control rocker arms 18 and the rotor clamp 23, such that the attack angle of the right rotor blade is decreased and the lift force is decreased, the attack angle of the left rotor blade is increased and the lift force is increased.

The symmetrical parts on the other side of the spindle 8 (not shown) in FIG. 7 generate the torques having the same size and the opposite direction.

It should be noted that in the above procedure, the balancing hammers 28 and the balancing rod 27 control the universal hinge joint point 56 on an end of the hybrid control rocker arms 18 through the upper connecting rod 26 to rotate up and down, and the rotation fulcrum is the universal hinge joint point 55 on the other end of the hybrid control rocker arms connected to the upper connecting rod 26. During the entire moving procedure, by using the universal hinge joint points 55 and 56 on both ends of the hybrid control rocker arms 18 as the fulcrums reciprocally, the balancing system and the operating system respectively transmit the control torques from the balancing system and the operating system to the rotor blades 24 through the rotor clamp 23, such that the rotor blades 24 rotate by using the axial line 25 of the rotor blade as the rotation axis.

Due to the function of the balancing hammers, the lift force of the right rotor blade is decreased, and the lift force of the left rotor blade is increased, such that the right rotor blade falls and the left rotor blade rises, thereby overcoming the interface from the outside on the model helicopter. Thus, the model helicopter recovers to the original stable balancing state.

Figure 9:
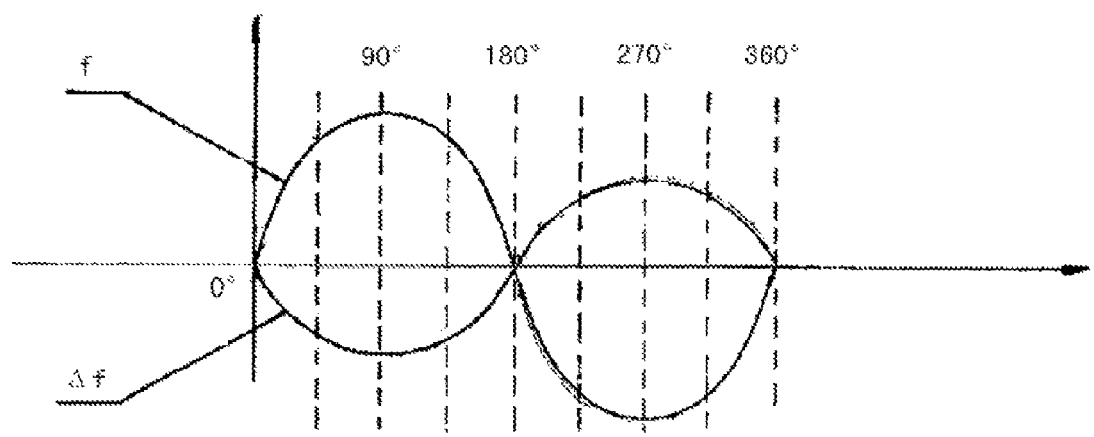
FIG. 9 is a schematic view of the change of an interference force applied on the rotor blades of the model helicopter when rotating a round and a lift force resulting from the change of an attack angle of the rotor blades.
Figure 10:
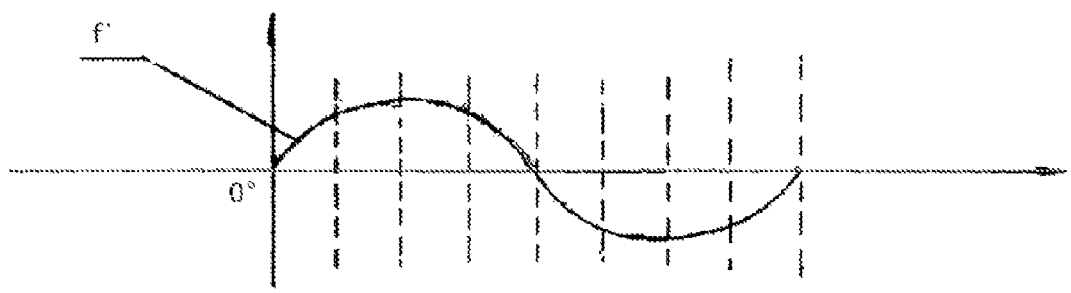
FIG. 10 is a schematic view of the interference force shown in FIG. 9 after a cycle of attenuation.
Figure 11:
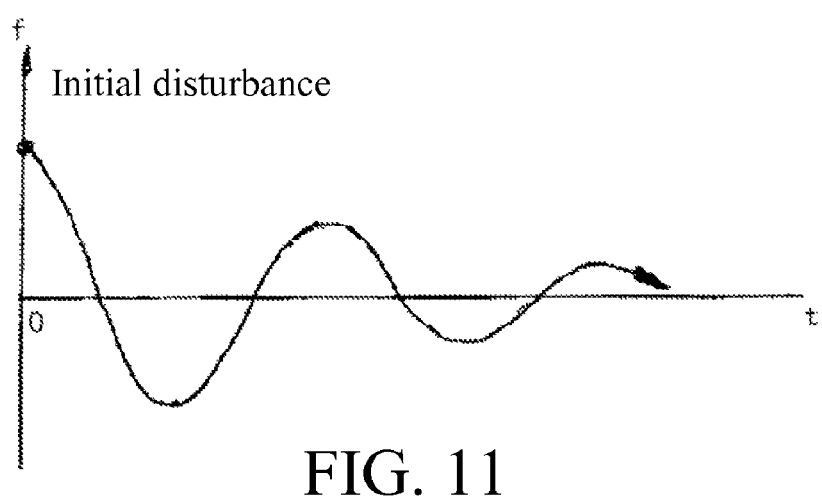
FIG. 11 is a schematic view of an attenuation procedure of the interference force shown in FIG. 9.

Since rotor blades of the model helicopter are in the high speed rotation state, an interference force from the outside is a cyclic interference force for the rotor blades. For ease of description, a pointed direction of the right ahead direction of the helicopter is set to 0 degree. In FIG. 9, the force f indicates the interference force applied on the rotor blades of the model helicopter when being rotated a round, and a variable of the lift force resulting from the change of the controlled attack angle after the rotor blades are affected by the gyro effect of the balancing hammers is indicated by Δf. In FIG. 9, the pointed directions of the interference force f and the variable of the lift force Δf are opposite, such that the interference force f is attenuated to f as shown in FIG. 10 after the 360° cycle. Then, the cycle continues, and the interference force f tends to be zero, as shown in FIG. 11. Therefore, the gyro effect of the balancing hammers enables the balancing system to overcome the interference from the outside, and the model helicopter according to the present invention has the dynamic stability.

In a preferred embodiment related to the balancing system according to the present invention, the basic parameters of the model helicopter are the same as the data of the experiment (1), main data of the balancing system is described in the following. A weight of the balancing hammers 28 is (2 g-6 g)×2, and a maximum rotation diameter of the balancing hammers is 190 mm. In the experiment, an angle 45° between the axial line 29 of the balancing hammers in front of the front edge 30 of the rotor blades and the axial line 25 of the rotor blades serves as the reference angle. It is proved by the experiment of the embodiment that when the model helicopter is operated through radio remote control to ravel, the range of the optimum angle between the axial line 29 of the balancing hammers and the axial line 25 of the rotor blades is from 45° to 35°, and 40° may be selected as the designed angle. However, the helicopter may fly in the range of the reference angle of 45°±20°; when the angle is biased from the optimum angle, the dynamic stability behavior gradually becomes poor. In the experiment, if the angle between the axial line of the balancing hammers and the axial line of the rotor blades is adjusted from 25° to 0°, when the model helicopter is operated, the model helicopter swings, and as the angle between the axial line of the balancing hammers and the axial line of the rotor blades is decreased, the swing amplitude is increased, and the stability of the model helicopter is significantly decreased. When the angle between the axial line of the balancing hammers and the axial line of the rotor blades is adjusted from 65° to 90°, the dynamic stability behavior also gradually becomes poor, and it is difficult to control the model helicopter to fly normally.

For the single rotor model helicopters having the same mode as the above embodiment but different specifications and important parameters, the optimum angle between the axial line of the balancing hammer and the axial line of the rotor blade are different, and the possible range and the importance of the problem are described in the embodiments described herein. During the design and the proving experiment, the horizontal angle between the axial line of the balancing rod and the axial line of the rotor blades may serve 45° as the reference angle, and is adjusted towards positive and negative directions. Finally, the angle is obtained when the balance behavior and the optimum combination of the balance behavior and the maneuverability is found through the experiment. The axial line of the balancing rod is in front of the front edge of the rotor blades, and the horizontal angle between the axial line of the balancing rod and the axial line of the rotor blades is between 25° and 65°.

In the present invention, the balance behavior may be adjusted by adjusting the length of the balancing rod and the weight of the balancing hammers. For example, not only different design parameters may be selected according to the different technical demands in design, but also heavier balancing hammers may be selected when a user just begins to learn to operate the helicopter. For example, for the balancing hammers of the model helicopter of the above embodiment, the beginner may select 5 g-6 g. With the development of the operation techniques, the weight of the balancing hammers may be gradually reduced to 3 g-1.5 g. It is proved by practice that the adjusting effect of the balance behavior of the present invention is much better than that of the "Bell-Hiller" mode.

To sum up, the hybrid control rocker arms 18 of the present invention helicopter are controlled by both the operating system and the balancing system. The hybrid control rocker arms

18 are rotated about the axial line 19 of the hybrid control rocker arms, and are rotated about the axial line 25 of the rotor blades as well. Actually, the rotations around the axial lines 19 and 25 occur at the same time. The hybrid control rocker arms 18 having the structure as shown in FIG. 7 are connected to the pitch control rocker arm 20 of the rotor blades through an axial hole. One end of the hybrid control rocker arms is the universal hinge joint 55 controlled by the middle connecting rods 17 of the operating system, and the other end is the universal hinge joint 56 controlled by the upper connecting rods 26 of the balancing system. Apparently, as long as at least two of the three connection points are universal hinge joints, the basic condition of the motion of the hybrid control rocker arms 18 is satisfied. The two universal hinge joints of the hybrid control rocker arms 18 serve as the control connection points for moving relative to each other as mutual fulcrums. The operating system control point of the hybrid control rocker arms moves with the hinge joint point controlled by the balancing system as the fulcrum, and the hinge joint point controlled by the balancing system moves with the operating system control point as the fulcrum. Further, the pitch control rocker arm 20 of the rotor blades is driven to enable the rotor blades to rotate about the axial line 25 of the rotor blades, thereby cyclically operating and controlling the blade angle of the rotor blades 24.

Figure 12:
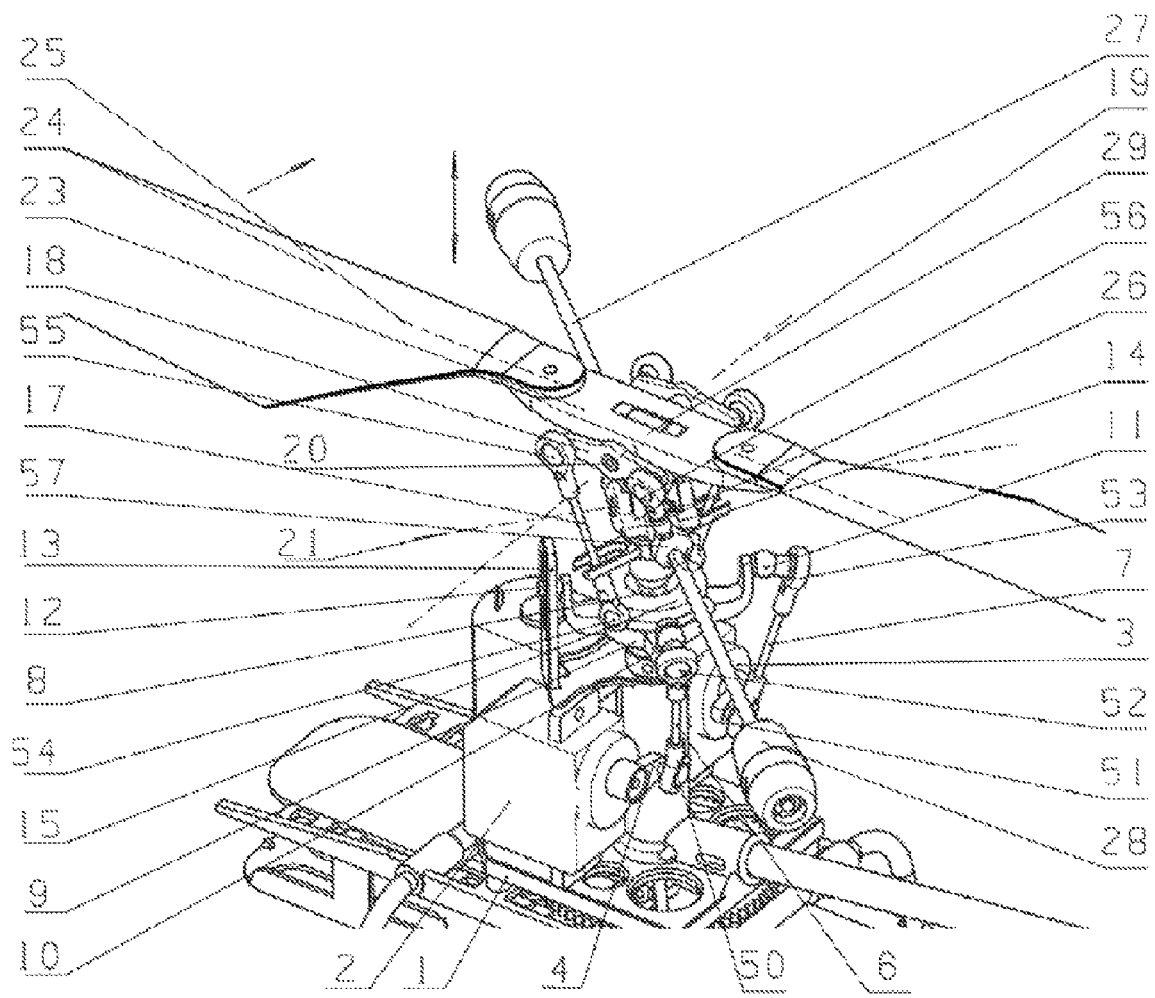
FIG. 12 is a schematic partial structural view of a single rotor model helicopter according to another embodiment of the present invention.

FIG. 12 is a schematic structural view of the remote control model helicopter according to another embodiment, in which the structure is approximately similar to the structure of the helicopter as shown in FIG. 7, except that the balancing rod 27 is disposed under the rotor blades 24. The detailed structure of this embodiment may be known from the above description, and is not described in detail here.

To sum up, the embodiments of the present invention have the following distinct advantages.

1. In the present invention, the mechanical balancing system and the mechanical operating system are used for controlling the blade angle through the mechanical hybrid control rocker arms; compared with the existing "Bell-Hiller" mode remote control model helicopter, the operating system and the balancing system of the present invention realize the cyclic operation control on the pitch of the rotor blades together through the hybrid control rocker arms. The two systems are relatively independent, and are capable of separately adjusting the operating sensitivity and the dynamic stability, so as to find the optimum combination of the dynamic stability and the maneuverability of the model helicopter, so as to meet demands of different persons, and particularly to provide a model having excellent stability, appropriate operating sensitivity, and low operation technique difficulty for beginners of the single rotor model helicopter.

2. In the present invention, the ranges of the angle between the mechanical longitudinal axial line and the X axis and the angle between the mechanical transversal axial line and the Y axis, and the method for obtaining the optimum angles through experiments are provided, so as to provide a simple and convenient solution for the design of the mechanical operating system.

3. Compared with the existing "Bell-Hiller" mode remote control model helicopter in which the axial lines of the balancing hammers and the rotor blades are perpendicular to each other constantly, in the present invention, the angle between the axial lines of the balancing hammers and the rotor blades may be adjusted with the angle 45° as the reference in design, and the optimum angle is obtained through experiments, such that the dynamic stability of the model helicopter is distinctly better than that of the "Bell-Hiller" mode.

4. Compared with the existing "Bell-Hiller" mode remote control model helicopter, the present invention may change the balance behavior of the helicopter effectively by adjusting the gyro effect of the balancing hammers (adjusting the weight or the rotation radius of the balancing hammers), so as to meet the demands of different persons.

Finally, it should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A single rotor model helicopter, comprising a spindle, a rotor clamp disposed on the spindle, a pair of rotor blades disposed on the rotor clamp, and a pair of hybrid control rocker arms, and further comprising an operating system and a balancing system, wherein the operating system comprises:
a first servo, having a first output shaft adapted to output a longitudinal operation torque;
a second servo, having a second output shaft adapted to output a transversal operation torque; and
a swash plate combination, connected to the first servo and the second servo through connecting rods, and adapted to convert the longitudinal operation torque and the transversal operation torque to a cyclic torque;
the balancing system comprises:
a balancing rod connected to the spindle, and a pair of balancing hammers disposed on both ends of the balancing rod;
wherein the pair of hybrid control rocker arms are respectively disposed on both sides of the rotor clamp, and rotatably connected to a pitch control rocker arm disposed on both sides of the rotor clamp through axial holes respectively;
each hybrid control rocker arm has two control points, wherein a first pair of control points diagonally opposite each other in the pair of hybrid control rocker arms are controlled by the cyclic torque transmitted from the swash plate combination, a second pair of control points diagonally opposite each other are controlled by the balancing system, and the second pair of control points controlled by the balancing system and the first pair of control points controlled by the swash plate combination move relative to each other as mutual fulcrums;
a mechanical longitudinal axial line of the model helicopter is at a position where there is an angle smaller than 90° between the mechanical longitudinal axial line and the longitudinal axis at an anti-rotor blade rotation direction of the longitudinal axis of the model helicopter, and a mechanical transversal axial line is at a position where there is an angle smaller than 90° between the mechanical transversal axial line and the transversal axis at an anti-rotor blade rotation direction of the transversal axis of the model helicopter; and
an axial line of the balancing rod is in front of a front edge of the rotor blades, and a horizontal angle between the axial line of the balancing rod and an axial line of the rotor blades is between 25° and 65°.

2. The single rotor model helicopter according to claim 1, wherein among three pairs of connection points including the pair of connection points of the axial holes of the hybrid control rocker arms and the pitch control rocker arm, the first pair of control points, and the second pair of control points, at least two pairs of connection points are pairs of universal hinge joint points.

3. The single rotor model helicopter according to claim 1, wherein the mechanical longitudinal axial line is perpendicular to the mechanical transversal axial line.

4. The single rotor model helicopter according to claim 1, wherein a reference mechanical longitudinal axial line of the helicopter is located on a position of 45° of the anti-rotor blade rotation direction of the longitudinal axis of the helicopter, and a reference mechanical transversal axial line of the helicopter is located on a position of 45° of the anti-rotor blade rotation direction of the transversal axis of the helicopter.

5. The single rotor model helicopter according to claim 1, wherein the swash plate combination comprises a non-rotating swash plate and a rotating swash plate disposed on the spindle of the helicopter, the non-rotating swash plate has a first rocker arm and a second rocker arm, the first rocker arm is connected to the first output shaft through a first lower connecting rod for transmitting the longitudinal operation torque, the second rocker arm is connected to the second output shaft through a second lower connecting rod for transmitting the transversal operation torque, the rotating swash plate has a pair of third rocker arms arranged symmetrically by using the spindle as a center, and the two third rocker arms are respectively connected to the first pair of control points of the pair of hybrid control rocker arms through two middle connecting rods.

6. The single rotor model helicopter according to claim 5, wherein the non-rotating swash plate further comprises an orientation arm limited to move up and down in a vertical sliding chute.

7. The single rotor model helicopter according to claim 1, wherein a pair of universal hinge joint points are disposed on the balancing rod, and the pair of universal hinge joint points are connected to the second pair of control points of the hybrid control rocker arms through a pair of upper connecting rods.

8. The single rotor model helicopter according to claim 1, wherein the balancing rod is connected to a top end of the spindle, and is located above the rotor clamp.

9. The single rotor model helicopter according to claim 1, wherein the balancing rod is located on the spindle under the rotor clamp.

10. The single rotor model helicopter according to claim 1, wherein the mechanical longitudinal axial line of the model helicopter is within a range from 70° to 20° of the anti-rotor blade rotation direction of the longitudinal axis of the model helicopter, and the mechanical transversal axial line of the helicopter is within a range from 70° to 20° of the anti-rotor blade rotation direction of the transversal axis of the model helicopter.

* * * * *